United States Patent
Linzer

(10) Patent No.: US 9,948,946 B1
(45) Date of Patent: Apr. 17, 2018

(54) TEMPORAL FILTERING BASED ON REDUCED-RESOLUTION MOTION DETECTION

(71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 429 days.

(21) Appl. No.: 14/688,071

(22) Filed: Apr. 16, 2015

Related U.S. Application Data

(60) Provisional application No. 62/097,663, filed on Dec. 30, 2014.

(51) Int. Cl.
  *H04N 19/00* (2014.01)
  *H04N 19/513* (2014.01)
  *H04N 19/139* (2014.01)
  *H04N 19/172* (2014.01)
  *H04N 19/117* (2014.01)
  *H04N 19/82* (2014.01)

(52) U.S. Cl.
  CPC ......... *H04N 19/513* (2014.11); *H04N 19/117* (2014.11); *H04N 19/139* (2014.11); *H04N 19/172* (2014.11); *H04N 19/82* (2014.11)

(58) Field of Classification Search
  CPC ............................ H04N 19/583; H04N 19/615
  USPC .................................................... 375/240.16
  See application file for complete search history.

(56) References Cited

U.S. PATENT DOCUMENTS

| | | | |
|---|---|---|---|
| 5,598,514 A | * | 1/1997 | Purcell .................. G06F 17/147 345/418 |
| 6,731,685 B1 | * | 5/2004 | Liu ........................ H04J 3/1688 348/385.1 |
| 2011/0090351 A1 | * | 4/2011 | Cote ........................ G06T 5/002 348/208.1 |

OTHER PUBLICATIONS

Iowegian International, "dspGuru", http://www.dspguru.com/dsp/faqs/multirate/resampling, Mar. 26, 2015, pp. 1-4.

* cited by examiner

*Primary Examiner* — Jeffrey Williams
(74) *Attorney, Agent, or Firm* — Christopher P. Maiorana, PC

(57) ABSTRACT

A method for temporal filtering based on reduced-resolution motion detection is disclosed. Step (A) may down-sample a target picture in a sequence of pictures to generate a reduced-resolution target picture. Step (B) may down-sample a reference picture in the sequence of pictures to generate a reduced-resolution reference picture. Step (C) may compute a plurality of reduced-resolution motion scores by motion detection between the reduced-resolution reference picture and the reduced-resolution target picture. Step (D) may temporal filter the target picture with the reference picture based on the reduced-resolution motion scores to generate a filtered picture. At least one of (i) the reduced-resolution motion scores and (ii) the generation of the filtered picture is controlled by one or more gain settings in a circuit.

20 Claims, 8 Drawing Sheets

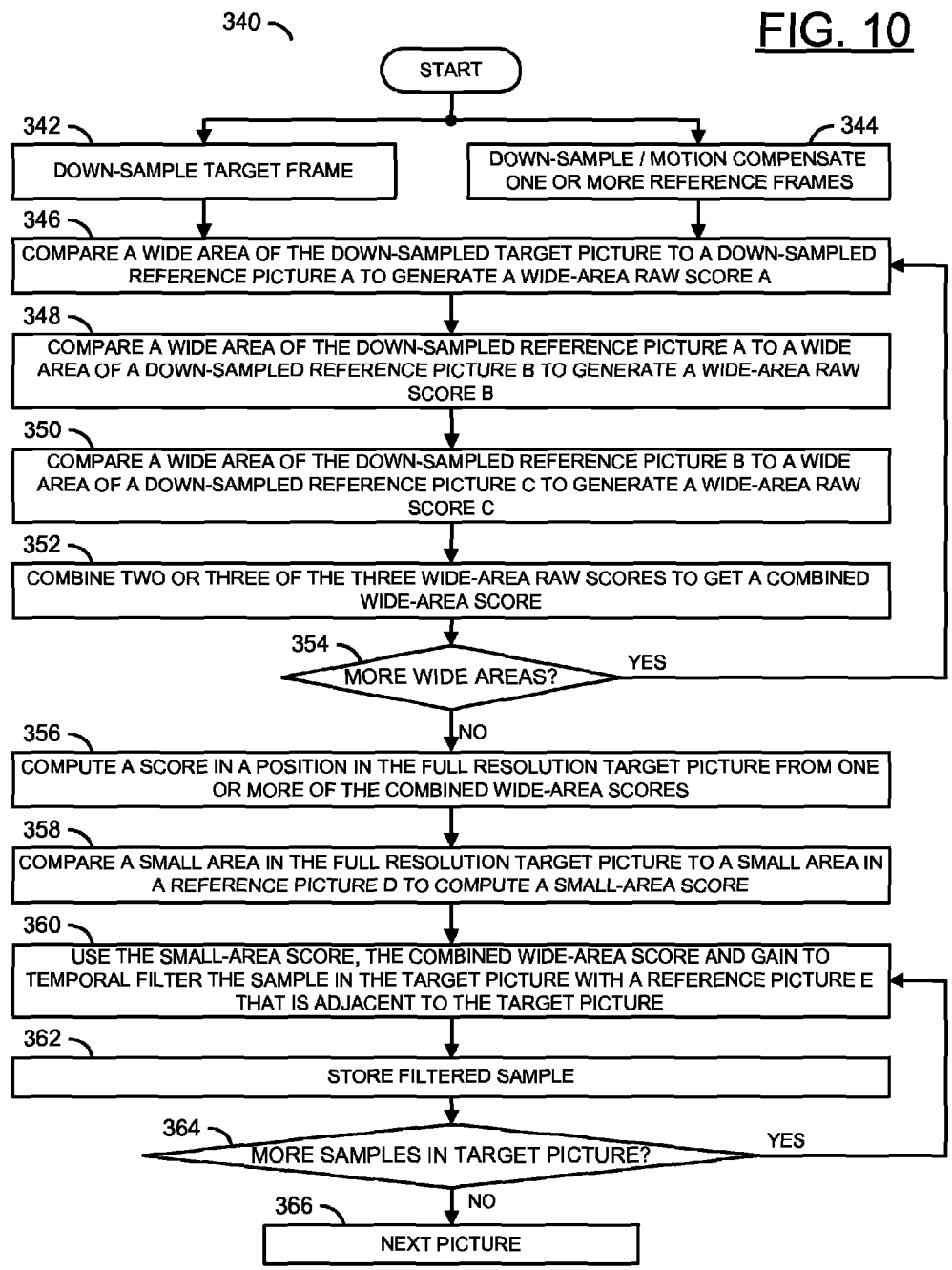

US 9,948,946 B1

TEMPORAL FILTERING BASED ON REDUCED-RESOLUTION MOTION DETECTION

This application relates to U.S. Provisional Application No. 62/097,663, filed Dec. 30, 2014, which is hereby incorporated by reference in its entirety.

FIELD OF THE INVENTION

The present invention relates to video temporal filtering with motion detection generally and, more particularly, to methods and/or apparatus for temporal filtering based on reduced-resolution motion detection.

BACKGROUND OF THE INVENTION

Conventional motion detection looks at a local error measure, commonly a sum-of-absolute-differences, between a target picture and a reference picture. Even if no motion exists, such local error measures tend to be non-zero due to noise and changes in scene lightness. Therefore, motion detection commonly detects small differences between the pictures as no motion and detects big differences as motion. Temporal filtering is used to combine a target picture with a motion compensated reference picture, and uses strong filtering where no motion is detected.

It would be desirable to implement temporal filtering based on reduced-resolution motion detection.

SUMMARY OF THE INVENTION

The present invention concerns a method for temporal filtering based on reduced-resolution motion detection. Step (A) may down-sample a target picture in a sequence of pictures to generate a reduced-resolution target picture. Step (B) may down-sample a reference picture in the sequence of pictures to generate a reduced-resolution reference picture. Step (C) may compute a plurality of reduced-resolution motion scores by motion detection between the reduced-resolution reference picture and the reduced-resolution target picture. Step (D) may temporal filter the target picture with the reference picture based on the reduced-resolution motion scores to generate a filtered picture. At least one of (i) the reduced-resolution motion scores and (ii) the generation of the filtered picture is controlled by one or more gain settings in a circuit.

The objects, features and advantages of the present invention include providing temporal filtering based on reduced-resolution motion detection that may (i) use motion detection between two different pairs of pictures to determine how to apply a temporal filter between a pair of the pictures, (ii) use a motion detection that covers a wide area and another motion detection that covers a small area to determine how to apply a temporal filter between the pair of the pictures, (iii) combine multiple motion detection scores to control the temporal filter and/or (iv) use motion detection between non-adjacent pictures to determine how to temporal filter between adjacent pictures.

BRIEF DESCRIPTION OF THE DRAWINGS

These and other objects, features and advantages of the present invention will be apparent from the following detailed description and the appended claims and drawings in which:

FIG. 10 is a flow diagram of another motion detection method.

DETAILED DESCRIPTION OF EMBODIMENTS motion detection may be used in many applications, such as security cameras, and/or in many operations, such as motion compensated temporal filtering (e.g., MCTF) a sequence of pictures (or images). For the motion compensated temporal filtering, a filter may adaptively combine one or more reference (or previous) pictures and a target (or current) picture of the sequence based on detected motion in the target picture relative to the reference pictures. The filtering may also decide locally how to combine the multiple pictures (e.g., fields and/or frames) to reduce noise while limiting filter-created artifacts.

Typically, the filter may favor a reference picture more the more the filter determines that no motion exists in a local area relative to the reference picture. For such a filter, motion may mean motion in an absolute sense, if motion exists. In various embodiments, the reference pictures may be pre-transformed per a motion model (e.g., a process used to estimate motion between the pictures). The transformed (motion compensated) reference pictures may be subsequently combined with the target picture. For a motion compensated temporal filtering case, motion generally means motion between the motion compensated reference pictures and the target picture. For a non-motion compensated temporal filtering case, motion generally means motion between the non-compensated reference pictures and the target picture.

Figure 1:
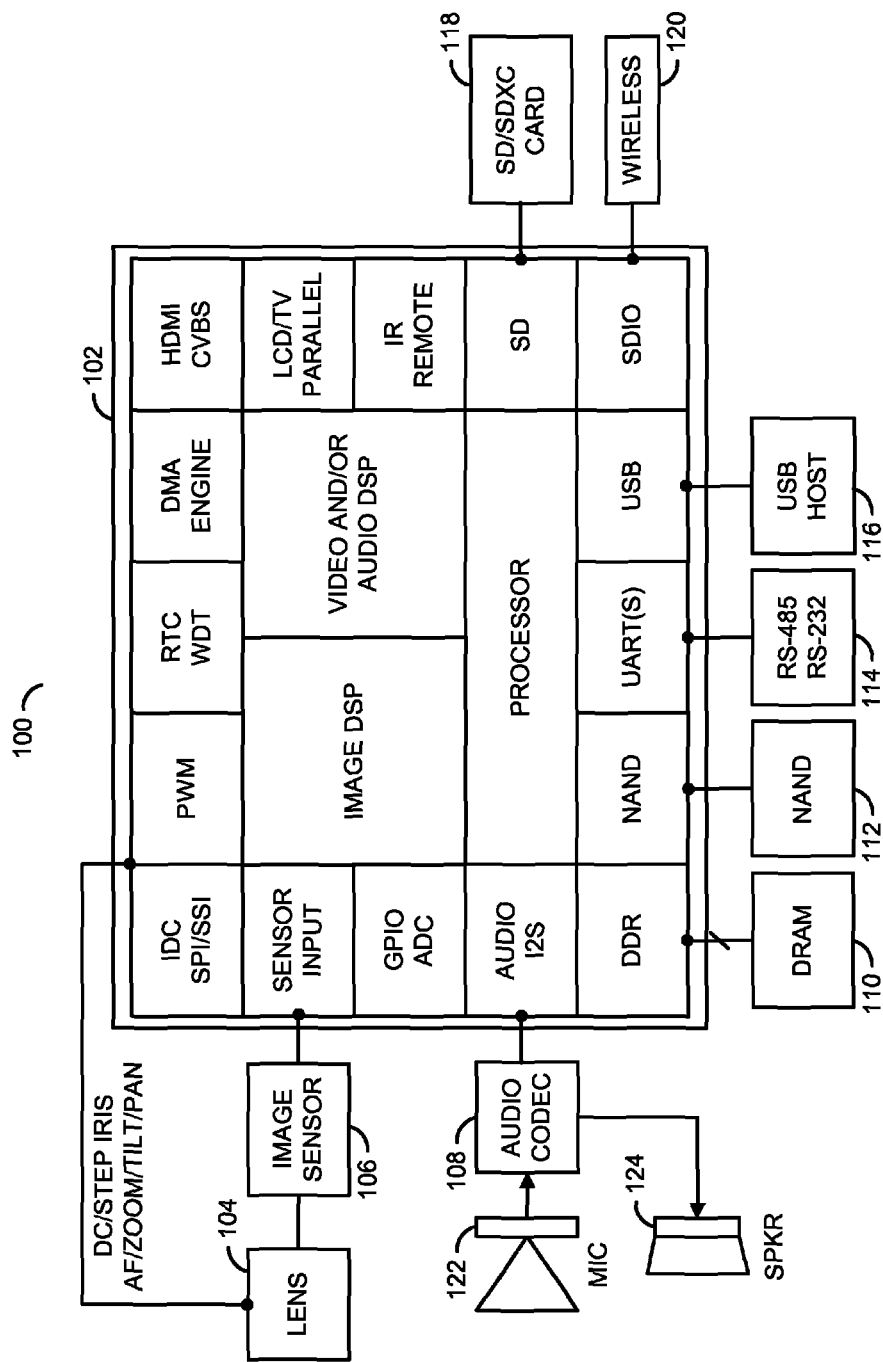
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a temporal filter with noise-robust and/or slow-motion robust motion detection may be stored in one or more of the memories 110 and 112. When executed by the circuit 102, the programming code generally causes the circuit 102 to receive a sequence of pictures from the sensor 106, temporal filter based on measurements if an area is stationary for several pictures, temporal filter based on motion detection on small and big areas, temporal filter based on comparing down-sampled pictures, and/or temporal filter adjacent pictures based on motion detection of non-adjacent pictures.

For noisy image sequences, the differences between pictures, even in stationary areas, may be large since the noise in each picture is different. Moreover, slow motion tends to add only small amounts to motion scores. Therefore, conventional motion detection may fail to correctly detect slow motion and/or motion in noisy sequences of pictures. False positives (e.g., detecting motion where none exists) may result in too-noisy output pictures. False negatives (e.g., not detecting actual motion) may result in temporal artifacts. Various embodiments of the present invention generally contain one or more of the following features that may be used individually or in combination to make temporal filtering based on motion compensation more robust.

Temporal filtering may be based on comparing down-sampled pictures. The technique of comparing down-sampled pictures generally has two advantages. Down-sampled pictures may be less noisy than full-resolution pictures. In addition, computations done on smaller down-sampled pictures may be cheaper (e.g., use fewer clock cycles, consume less power, consume fewer resources, etc.) than computations based on full resolution pictures.

Motion detection may be based on observing if the video is stationary or moving for several pictures (or frames or fields). Specifically, for the same location, scores are generally used from multiple picture comparisons. By incorporating extra data into the still or moving decision, the detection may be more robust.

Temporal filtering is generally based on motion detection on areas of different sizes (e.g., small areas and wide areas). Scores computed over still (e.g., non-moving) wide areas may vary less than scores computed over still small areas (e.g., small relative to the wide areas) due to noise because of the law of large numbers. However, such scores may not precisely delineate which part of the picture is moving. Using small scores and large scores may gain added robustness with respect to noise while maintaining higher precision in the location of the motion.

Temporal filtering of adjacent pictures may be based on motion detection of non-adjacent pictures. Adjacent pictures may be combined with a temporal filtering because adjacent pictures are generally more similar to each other than non-adjacent pictures. For slow motion, non-adjacent pictures may exhibit greater motion and, therefore, may exhibit higher motion scores than adjacent pictures. Performing detection on non-adjacent pictures (e.g., a target picture and a non-adjacent reference picture) may provide a more robust detection of slow motion, especially in the presence of noise.

Figure 2:
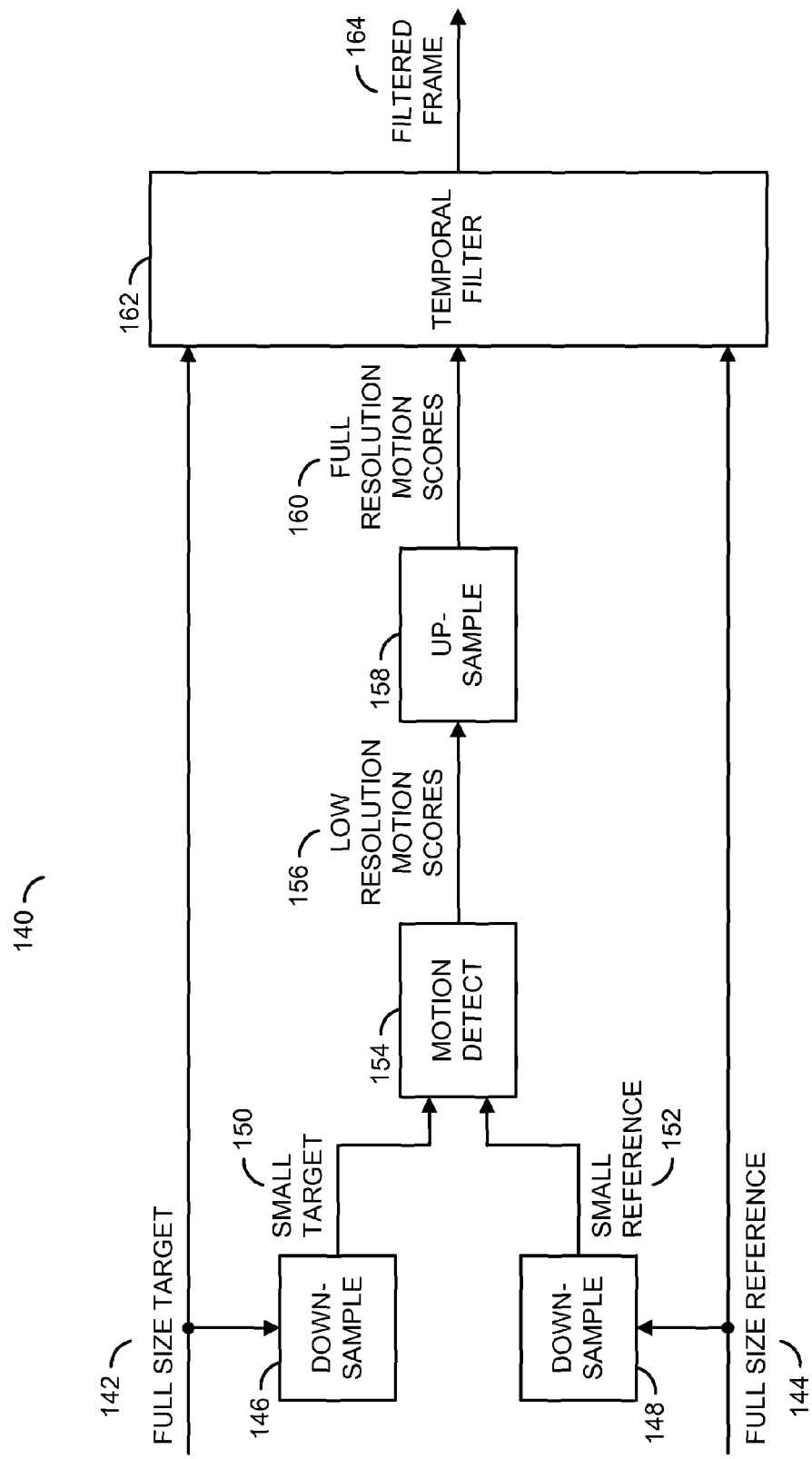
FIG. 2 is a functional flow diagram of a temporal filter method in accordance with a preferred embodiment of the present invention.

Referring to FIG. 2, a functional flow diagram of a temporal filter method 140 is shown in accordance with a preferred embodiment of the present invention. The method (or process) 140 may be implemented in the circuit 102. The method 140 generally comprises a module (or circuit) 146, a module (or circuit) 148, a module (or circuit) 154, a module (or circuit) 158, and a module (or circuit) 162. The circuits 146-162 may be implemented in hardware, software, firmware or any combination thereof in an apparatus (or circuit or device).

Input frames may include a full size target frame 142 and a full size reference frame 144. The full size target frame 142 may be received by the circuit 146 and the circuit 162. The full size reference frame 144 may be received by the circuit 148 and the circuit 162.

The circuit 146 may implement a down-sample circuit. The circuit 146 is generally operational to down sample (or reduce) a resolution (e.g., reduce a number of samples) in the full size target frame 142. The down sampling may be implemented by standard techniques. The resulting reduced-resolution (or small) target frame 150 may be presented to the circuit 154. Consider an example where the full size target frame 142 is 1000×1000 samples. The down-sampling may create the reduced-resolution target frame 150 at 250×250 samples (e.g., a quarter down-sample in each dimension X and Y).

The circuit 148 may implement another down-sample circuit. The circuit 148 is generally operational to down sample (or reduce) a resolution (e.g., reduce a number of samples) in the full size reference frame 144. The down sampling may be implemented by standard techniques. The resulting reduced-resolution (or small) reference frame 152 may be presented to the circuit 154. Returning to the example, the full size reference frame 144 may be down sampled by the circuit 148 from 1000×1000 samples to create the reduced-resolution reference frame 152 at 250×250 samples (e.g., a quarter down-sample in each dimension).

The circuit 154 may implement a motion detect circuit. The circuit 154 is generally operational to detect motion between the reduced-resolution target frame 150 and the reduced-resolution reference frame 152. The detected motion may be represented as one or more motion scores. In various embodiments, one or more comparisons may be performed on a sample-to-sample basis between the two reduced-resolution frames 150 and 152. Each comparison may be a sum-of-absolute differences or a sum-of-differences squared. Other comparison techniques may be implemented to meet the criteria of a particular application. In the example, the two 250×250 sample frames 150 and 152 may be compared to generate a 250×250 array (or matrix) for the reduced-resolution motion scores 156.

The circuit 158 may implement an up-sample circuit. The circuit 156 is generally operational to up-sample the array of reduced-resolution motion scores to generate an array of full-resolution (or full size) motion scores. In various embodiments, a resolution of the array of full-resolution motion scores generally matches a resolution of the frames 142 and 144. The up-sampling may be performed by one or more normal polyphase up-sampling techniques. Returning to the example, the 250×250 array of reduced-resolution motion scores 156 may be up-sampled by the circuit 158 to create a 1000×1000 array of full-resolution motion scores 160 (e.g., an up-sampling by a factor of four in each dimension X and Y).

In other embodiments, replication may be used for up-sampling in the circuit 158. For example, the 250×250 array of reduced-resolution motion scores may be up-sampled by replicating each result 4 times horizontally and 4 times vertically so that each result is replicated a total of 16 times.

In yet other embodiments, the motion detection circuit 154 may compute motion scores at a lower resolution than the input pictures 150 and 152. For example, each motion score may be a sum-of-absolute differences over a tile (or rectangle) in the target picture and the reference picture. Returning to the example where the target picture and the reference picture have the size of 250×250 samples, the pictures may be divided into 125×125 tiles, each tile having a 2×2 size. Each motion score may be computed as the sum-of-absolute differences in the 2×2 tiles. Therefore, a motion score resolution is generally 125×125 values. In another embodiment, the 250×250 sample pictures may be divided into 50×50 tiles, each of size 5×5. Each motion score may be computed as the sum-of-absolute differences in the 5×5 tiles. Hence, the motion score resolution is generally 50×50 values. When the circuit 154 computes motion scores at a lower resolution than the input pictures 150 and 152, the circuit 158 may up-sample from the motion score resolution to the full resolution of the input pictures 150 and 152. For the examples, the up-sampling would be from 125×125 to 1000×1000 or from 50×50 to 1000×1000.

The circuit 162 may implement a temporal filter circuit. The circuit 162 is generally operational to blend the full size target frame 142 with the full size reference frame 144. An amount of blending may be based on the full resolution motion scores 160. A blended (e.g., temporal filtered) frame 164 may be generated and presented by the circuit 162.

Figure 3:
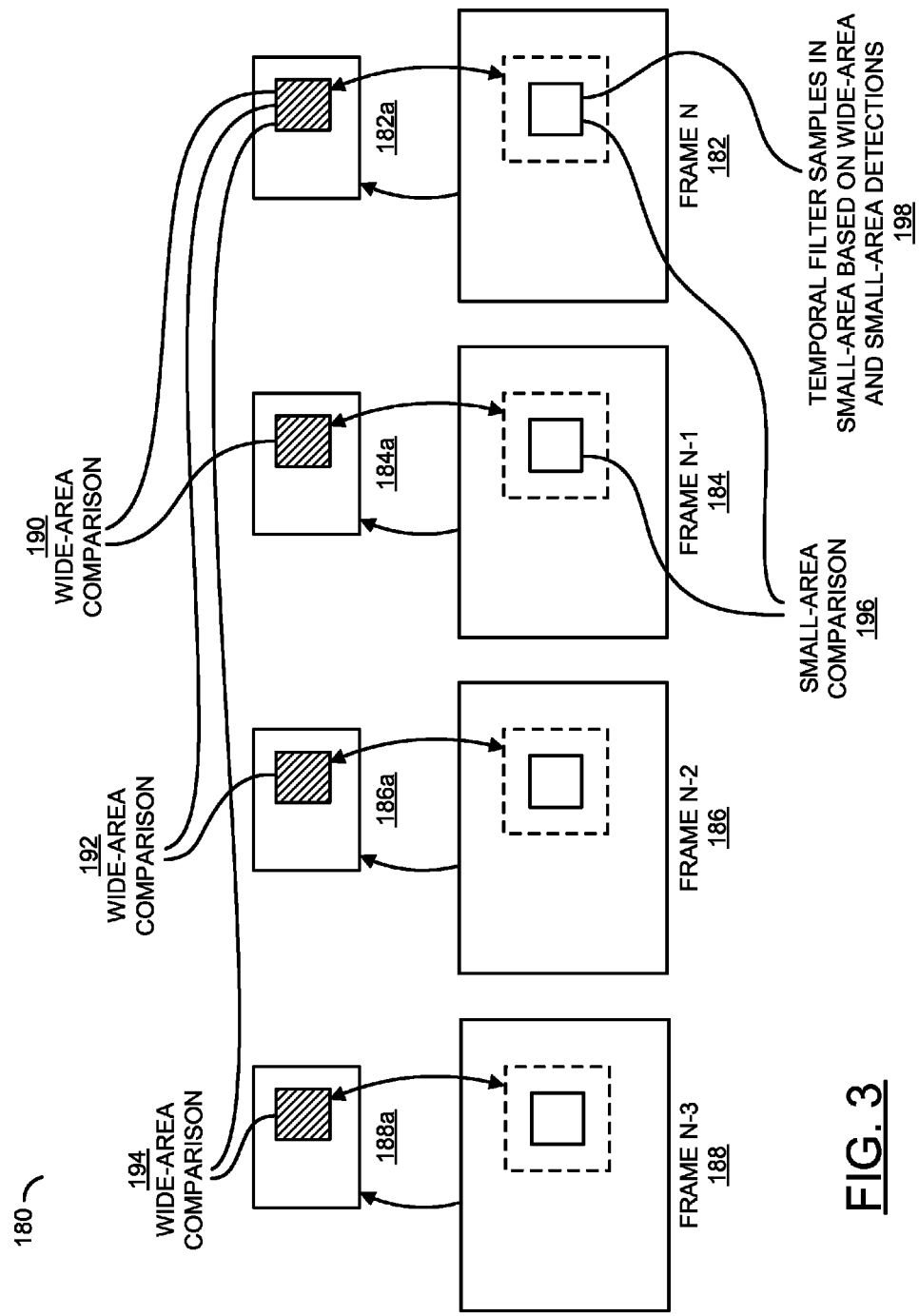
FIG. 3 is a graphical representation of several motion detections.

Referring to FIG. 3, a graphical representation 180 of several motion detections is shown. Consider a sequence of several frames N to N−3 (e.g., reference numbers 182 to 188). Motion detections may be performed between full-resolution frames N to N−3 (182-188) and reduced-resolution frames (182a-188a) using different sizes and/or shapes of areas. Computational costs and resource consumption may be reduced by computing some motion scores using scaled-down pictures. Computing a motion score for a given area generally involves processing more samples in the full-resolution pictures than a proportionally smaller number of samples in the scaled-down pictures. Additional details regarding motion detection using different sized areas may be described in co-pending U.S. patent application Ser. No. 14/667,950, filed Mar. 25, 2015, which is hereby incorporated by reference in its entirety.

An initial wide-area motion detection 190 generally compares a wide area (shaded boxes in the frames 182a-188a) in the reduced-resolution frame N (e.g., the frame 182a) and the co-located wide area in the reduced-resolution frame N−1 (e.g., the frame 184a). Another wide-area motion detection 192 may be performed between the wide areas in the reduced-resolution frame N (e.g., the frame 182a) and the reduced-resolution frame N−2 (e.g., the frame 186a). Still another wide-area motion detection 194 of the wide area may be performed between the reduced-resolution frame N (e.g., the frame 182a) and the reduced-resolution frame N−3 (e.g., the frame 188a). A small-area motion detection 196 may compare a small area (white boxes in the frames 182-188) in the full size (or full-resolution) frame N (e.g., the frame 182) and a co-located small area in the full-resolution frame N−1 (e.g., the frame 184). Temporal filtering 198 may be performed on one or more samples in the small area of the full-resolution frame N (e.g., the frame 182) based on both the wide-area motion detections 190-194 and the small-area motion detection 196.

The wide areas generally cover more area or more samples (the dotted boxes in the frames 182-188) of the full size pictures 182-188 than the small areas. For example, the wide areas may be 8×8 samples, 16×16 samples, 32×32 samples, or 64×64 samples relative to the full size pictures 182-188. The small areas may be 7×7 samples, 5×5 samples, 3×3 samples or a single sample. In some embodiments, the wide areas may have fewer samples in the reduced-resolution pictures 182a-188a than the samples in the small areas of the full size pictures 182-188. For example a 16×16 sample wide area in the full size picture 182 may contain only 4×4 samples in the reduced-resolution picture 182a (e.g., scaled down at ¼ by ¼), whereas the small area in the full size picture 182 may contain 7×7 samples. Shapes other than square may be implemented for the wide areas and/or the small areas. For example, the wide areas may be diamond shaped or rectangular shaped (e.g., 16×8 samples). The small areas may be rectangular shaped (e.g., 3×1 samples). Other sizes and shapes may be implemented to meet the criteria of a particular application.

Figure 4:
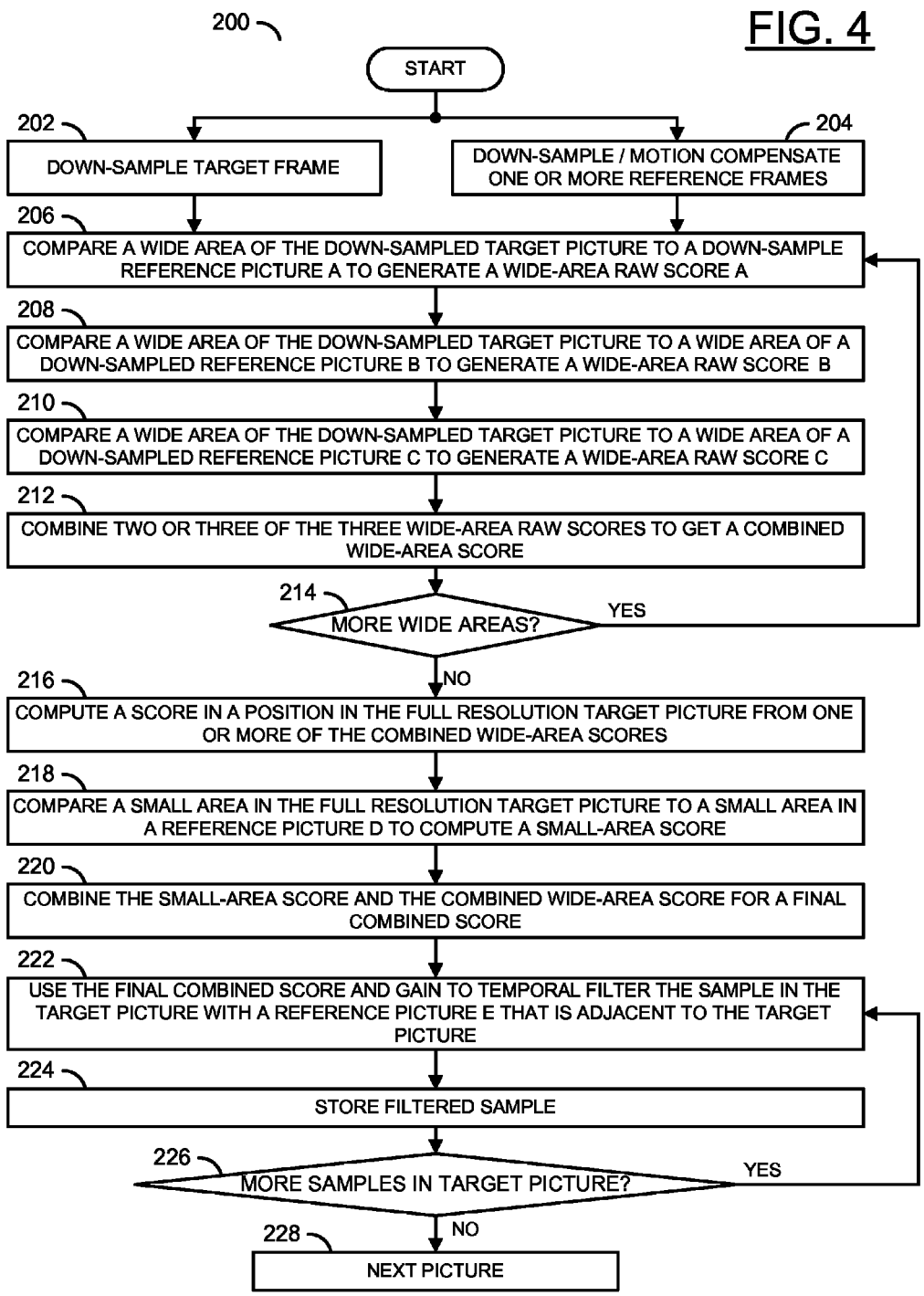
FIG. 4 is a flow diagram of a motion detection method.

Referring to FIG. 4, a flow diagram of a motion detection method 200 is shown. The method (or process) 200 may be performed by the circuit 102. The method 200 generally comprises a step (or state) 202, a step (or state) 204, a step (or state) 206, a step (or state) 208, a step (or state) 210, a step (or state) 212, a decision step (or state) 214, a step (or state) 216, a step (or state) 218, a step (or state) 220, a step (or state) 222, a step (or state) 224, a decision step (or state) 226 and a step (or state) 228. The steps 202-228 may be implemented in hardware, software, firmware or any combination thereof in an apparatus (or circuit or device). The sequence of the steps is shown as a representative example. Other step orders may be implemented to meet the criteria of a particular application.

In some embodiments, the method 200 may start with the step 202 and the step 204 performed in parallel (or simultaneously), as shown. In other embodiments, the steps 202 and 204 may be performed sequentially. The step 202 may down-sample a target picture (e.g., down-sample the frame 182 to the frame 182a in FIG. 3). The step 202 generally converts the target picture from a full-resolution target picture to a reduced-resolution target picture. The step 204 may down-sample one or more reference pictures (e.g., down-sample the reference frame 184 to the frame 184a). The step 204 generally converts each reference picture from a full-resolution reference picture to a reduced-resolution reference picture. The step 204 may optionally motion compensate the reference pictures and/or the reduced-resolution reference pictures before or after the down sampling. In certain applications, such as where the camera is known to be stationary, the step 204 may skip the motion compensation and non-motion-compensated reference pictures may be used in subsequent steps.

The step 206 may compare a wide area of the down-sampled target picture (e.g., the frame 182a) to a spatially co-located area of a down-sampled reference picture A (e.g., the frame 184a) to generate a wide-area raw score A (e.g., a target motion score). In some embodiments, the reference picture A may not be temporally adjacent to the target picture N (e.g., the reference picture A may be the frame 186a). In other embodiments, the reference picture A may be temporally adjacent to the target picture N. In the step 208, the wide area of the down-sampled target picture N (e.g., the frame 182a) may be compared with the spatially co-located wide area of another down-sampled reference picture B (e.g., the frame 186a) to generate another wide-area raw score B (e.g., an additional motion score). The wide area of the down-sampled target picture N (e.g., the frame 182a) may be compared in the step 210 to the spatially co-located wide area of a down-sampled reference picture C (e.g., the frame 188a) to generate a wide-area raw score C (e.g., another motion score). The circuit 102 may combine two or three of the three wide-area raw scores A, B and/or C in the step 212 to generate a combined wide-area score. The decision step 214 generally determines if additional detections may be useful in one or more additional wide areas. If the additional detections may be useful, the steps 206-212 may be repeated.

After all of the wide-area raw scores and the combined wide-area scores have been generated, the step 216 may compute a score in each position within the full resolution target picture from one or more neighboring scores of the combined wide-area scores (e.g., the block 158 in FIG. 2). Computing the scores for the positions in the full resolution target picture from reduced-resolution scores may use normal up-scaling techniques, such as polyphase multi-tap resampling. Alternatively, simple repetition may be used. For example, if the reduced-resolution motion scores are at an integer fraction (e.g., 1/16th) of the full resolution in the horizontal and vertical directions, each reduced-resolution motion score may be used for an integer squared (e.g., a 16×16) block in the full-resolution picture.

The step 218 may compare a small area in the full-resolution target picture N (e.g., the frame 182) to a small area in a full-resolution reference picture D (e.g., the frame 184) to compute a small-area score. In various embodiments, the full-resolution reference picture D (e.g., the frame N−1 or N+1) may be temporally adjacent to the target picture N. The step 220 may combine the small-area score with the combined wide-area score to generate a final combined score. In the step 222, the circuit 102 may use the final combined score and a gain value, applied by the circuits 102 and/or 106, to temporal filter (e.g., the block 162 in FIG. 2) a target sample in the small area of the full-resolution target picture N (e.g., the frame 182) with another full-resolution reference picture E (e.g., the frame 184). The reference picture E (e.g., the frame N−1 or N+1) may be temporally adjacent to the target picture N. In some embodiments, the reference picture E may be the same as the reference picture D. In the step 224, the filtered target sample may be stored in one or more of the memories (e.g., the memory 110).

A check may be performed in the decision step 226 to determine if any more target samples exist in the current full-resolution target picture. If more target samples have yet to be processed, the method 200 may move to the next unprocessed target sample and return to the temporal filter process (e.g., the step 222). Once all of the target samples in the current full-resolution target picture N have been processed, the method 200 may continue in the step 228 with the target samples in the next picture.

The gain settings in the camera system 100 may include an analog gain and/or a digital gain in the image sensor 106, and/or a digital gain in the circuit 102. One or more of such settings may be considered in the temporal filtering. Furthermore, offset settings, exposure settings and/or aperture settings may also be considered in the temporal filtering. The circuit 102 generally controls the lens assembly 104 and/or the image sensor 106 for an automatic exposure operation. Changes in the automatic exposure may change the light levels in the image data received from the sensor 106. The gain settings affect the noise in pictures; therefore, any of the steps computing the various scores (e.g., the steps 206, 208, 210 and/or 218), combining the scores (e.g., the steps 212 and/or 220), and/or using the scores for temporal filtering (e.g., the step 222) may be controlled based on the gain settings, offset settings, exposure settings and/or aperture settings.

The scores computed in the steps 206, 208, 210 and/or 218 may be any score that is generally higher when motion exists between pictures. The scores may include, but are not limited to, sum-of-absolute-differences and sum-of-squared-differences. The scores may further be modified based on tone (e.g., brightness and/or color) as described in co-pending U.S. patent application Ser. No. 14/580,867, filed Dec. 23, 2014, which is hereby incorporated by reference in its entirety.

Figure 6:
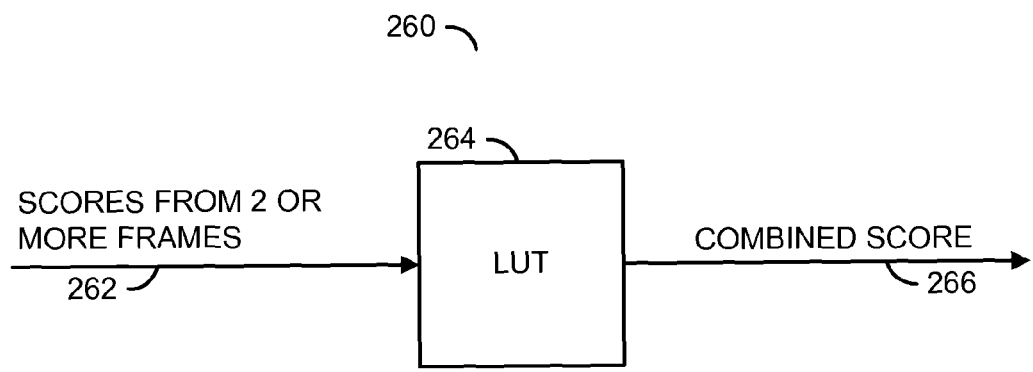
FIG. 6 is a diagram of a score combination by lookup.
Figure 7:
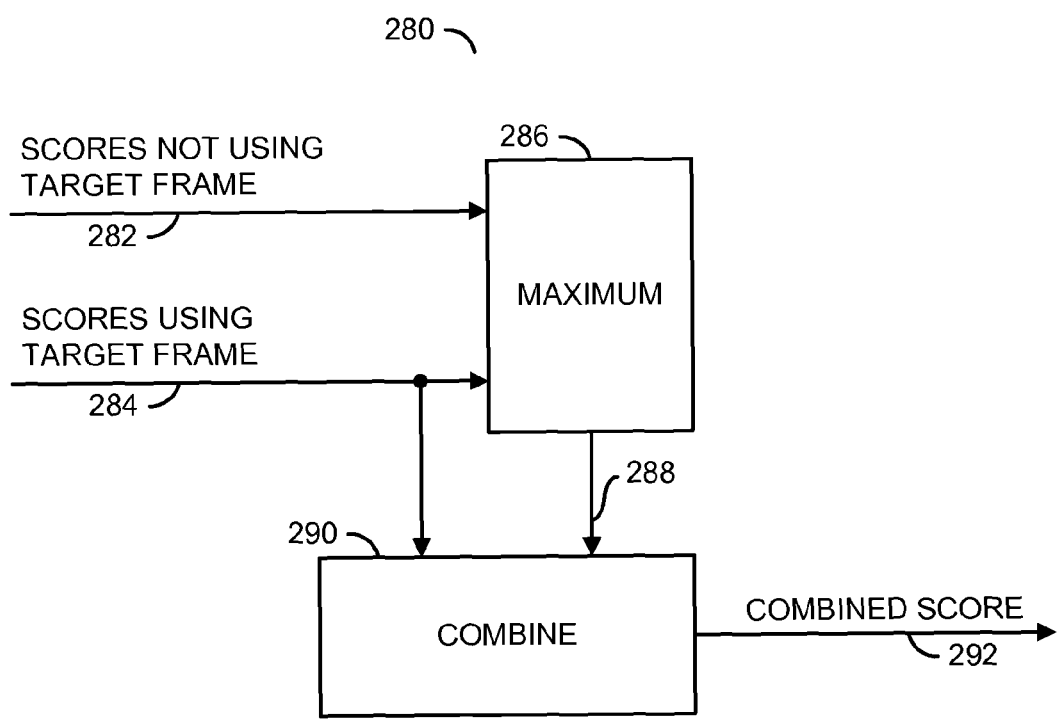
FIG. 7 is a diagram of a score combination using maximum and two-dimensional combining.
Figure 9:
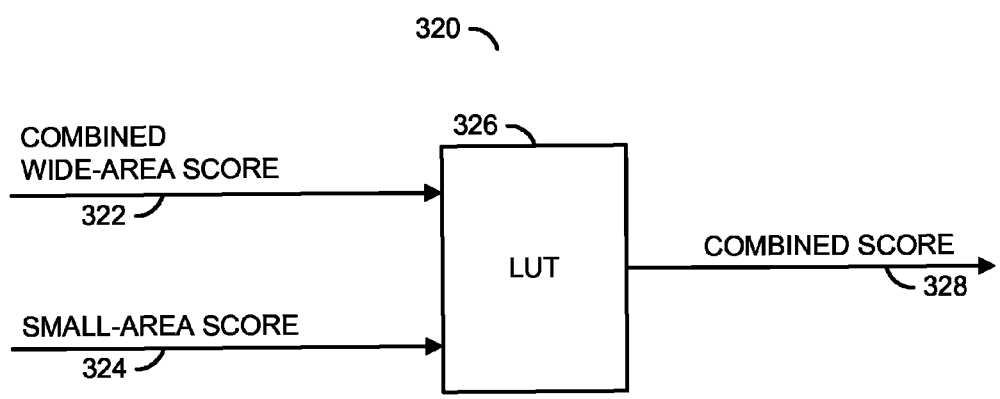
FIG. 9 is a diagram for combining a small-area score and a combined wide-area score with a lookup table.

The steps 206-210 generally show three picture comparisons. In general, more or fewer picture comparisons may be implemented to meet the criteria of a particular application. The combining operations may use lookup tables and/or mathematical transformations to generate the combined motion scores. The step 212 generally shows combining two or more scores from different pictures. FIGS. 6, 7 and 9 may illustrate embodiments of various combination operations. Other comparisons between the target frame N (182) and the reference frames may be implemented.

Figure 5:
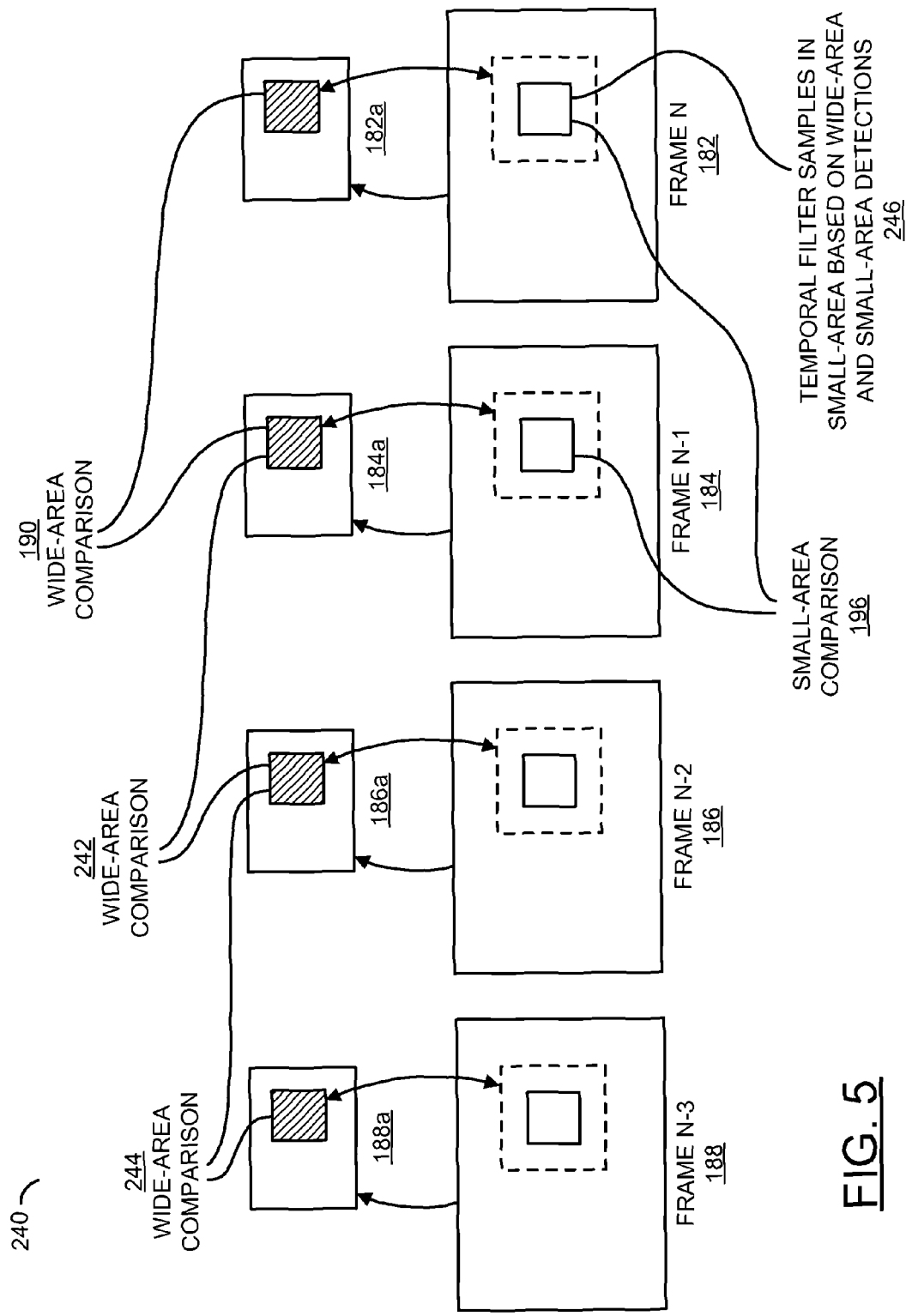
FIG. 5 is another graphical representation of several motion detections.

Referring to FIG. 5, a graphical representation 240 of several motion detections is shown. Consider the sequence of multiple frames N to N−3. As in the representation 180, the motion detection 190 generally detects wide-area motion between the reduced-resolution target frame N (e.g., the frame 182a) and the reduced-resolution reference frame N−1 (e.g., the frame 184a). The detected motion may establish (e.g., the step 206 in FIG. 4) the wide-area raw score A. Another motion detection 242 may detect wide-area motion between the reduced-resolution reference frame N−1 (e.g., the frame 184a) and the reduced-resolution reference frame N−2 (e.g., the frame 186a) to calculate the wide-area raw score B. The motion detection 242 may be a variation of the step 208. In various embodiments, a motion detection 244 may detect wide-area motion between the reduced-resolution reference frame N−2 (e.g., the frame 186a) and the reduced-resolution reference frame N−3 (e.g., the frame 188a) to calculate the raw score C. The motion detection 244 may be a variation of the step 210. In some embodiments, the motion detection 244 may be between the reduced-resolution target frame N (e.g., the frame 182a) and reduced-resolution the reference frame N−3 (e.g., the frame 188a). In other embodiments, the motion detection 244 may be between two of the reduced-resolution reference frames (e.g., between the reduced-resolution reference frame N−3 and a reduced-resolution reference frame N−4).

The step 212 may combine two or three of the wide-area raw scores A, B and/or C to calculate the combined wide-area score. The small-area comparison 196 may be performed in the step 218. The circuit 102 may combine the combined wide-area score and the small-area score to generate the final combined score in the step 220. The final combined score and the gain value may be used by the circuit 102 in the step 222 to temporal filter 246 a target sample in the area of the full-resolution target picture N with the full-resolution reference picture E. The full-resolution reference picture E (e.g., frame N−1 or N+1) may be temporally adjacent to the full-resolution target picture N. In the step 224, the filtered target sample may be stored in one or more of the memories (e.g., the memory 110). Thereafter, additional target samples and additional target pictures may be filtered.

Referring to FIG. 6, a diagram of an example score combination 260 by lookup table is shown. A signal 262 may carry the wide-area scores from two or more reduced-resolution frames to a multi-dimensional lookup table (e.g., LUT) 264. An entry (or value) stored in the LUT 264 at an index formed by the wide-area scores may be presented from the LUT 264 as the combined wide-area score in a signal 266.

Referring to FIG. 7, a diagram of an example score combination circuit (or module) 280 using maximum selection and two-dimensional combining is shown. The scores that do not use the target frame N may be received via a signal 282 by a maximum circuit (or module) 286. The scores that use the target frame N may be received by the maximum circuit 286 and a combine circuit (or module) 290 via a signal 284. The circuit 286 is generally operational to select a maximum score (or value) among the received scores. The maximum score may be passed in a signal 288 to the circuit 290. The circuit 290 is generally operational to perform a two-dimensional lookup or mathematical operations on the scores received in the signals 284 and 288 to generate and present a combined score in a signal 292.

Various embodiments of the circuit 290 may implement a two-dimensional (e.g., a dimension for the signal 284 and another dimension for the signal 288) lookup. Other embodiments of the circuit 290 generally select the highest score in the signal 288. Some embodiments of the circuit 290 may transform the maximum score per formula 1 as follows:

$$\text{Combined\_score} = ((\text{Max\_score} - SUB) \times MUL) \quad (1)$$

Where a subtraction value SUB and a multiplication value MUL may be controllable parameters, and where a value Max_score may be the maximum score in the signal 288. Still other embodiments may transform the maximum score with the score in the signal 284 as follows:

If(Max_score<THR) Combined_score=0;
  else {
    A=(CUR−SUB)×MUL)
    Combined_score=max(Min_score, A)
  }

Where a threshold THR, a minimum score Min_score, the subtraction value SUB and the multiplication value MUL may be controllable parameters. A current value CUR may be the score that uses the target picture N in the signal 284. The temporal filtering may combine the target picture N and a reference picture using a blending curve.

Figure 8:
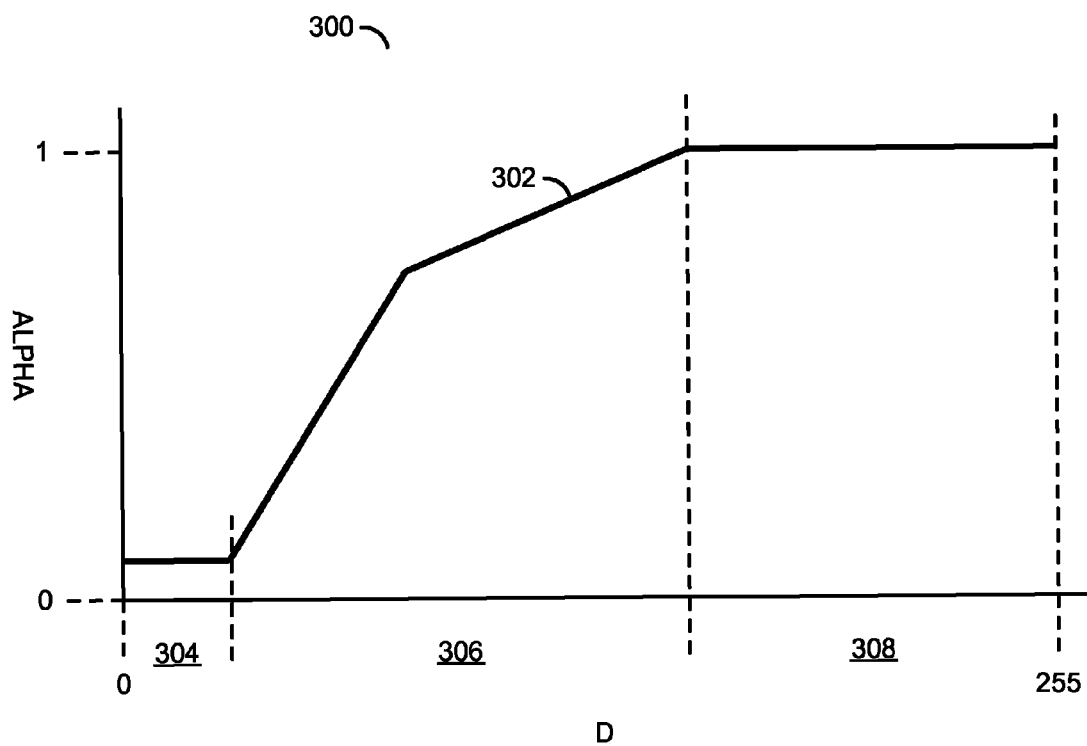
FIG. 8 is a diagram of a blending curve.

Referring to FIG. 8, a diagram 300 of an example blending curve 302 is shown. A strength of the temporal filtering (or blending) may be a continuum for one or more filter strengths. The diagram 300 generally illustrates a range of medium filter strengths and fixed filter strengths. A degree of filtering may depend on the blending curve 302.

An example of blending is generally determined as follows:
  T=target (current) sample;
  R=reference (previous) sample;
  D=detected motion score; and
  Alpha (curve 302)=lookup of the value D.
A filtered result (sample) may be calculated by formula 2 as follows:

$$\text{Result} = (\text{Alpha} \times T) + ((1 - \text{Alpha}) \times R) \quad (2)$$

In the diagram 300, the X axis generally represents the detected motion value D (e.g., the small-area score or the final combined motion score of the target frame N). For 8-bit levels of detected motion, the X axis is generally labeled from 0 to 255. The Y axis generally represents an alpha value (or transformed motion score) and ranges from 0 (zero) to 1 (unity). Other ranges of D and alpha may be implemented to meet the criteria of a particular application. Other techniques for determining the value D may also be implemented, such as considering several target samples simultaneously.

Small detected motion values D may be illustrated in the section 304. The section 304 generally results in a low value of alpha per the blending curve 302. Medium (or intermediate) detected motion values D may be illustrated in the section 306. The section 306 generally results in a range of values for alpha per the blending curve 302. Large detected motion values of D may be illustrated in the section 308. The section 308 generally results in a high value of alpha per the blending curve 302.

Where slow or no motion is detected, the value D is small and in the section 304. Therefore, the value alpha may be small (and optionally a fixed value). Per formula 2, the small value alpha generally weights the blending to favor the reference sample, or in some cases (e.g., alpha=0.5) averages the reference sample with the target sample. Such blending may be considered a strong filtering. Where medium motion is detected, the value D may be medium and in the section 306. Thus, the value alpha may be medium. Per formula 2, the medium value alpha variably weights the blending between the target sample and the reference sample, depending on the level of motion. Such blending may be considered a medium filtering. Where fast motion is detected, the value D may be large and in the section 308. Therefore, the value alpha may be large and weights the blending to favor the target sample. Such blending is generally considered a weak filtering. Where the value alpha=1, no filtering is accomplished and the target sample is unchanged.

In various embodiments, the blending curve 302 may be implemented as one or more LUTs. For example, a single LUT (e.g., LUT 264) may store all points of the blending curve 302. The value D may be implemented as the final combined score value or the small-area score value.

In other embodiments, different LUTs may store different blending curves and/or different portions of one or more blending curves. Selection of a particular LUT is generally based on a wide-area score (e.g., the wide-area raw score A value or the combined wide-area score value). For example, if the combined wide-area score is zero, an LUT number 0 may be utilized. If the combined wide-area score is greater than zero and less than a threshold T1, an LUT number 1 may be utilized. If the combined wide-area score is greater than the threshold T1 and less than a threshold T2, an LUT number 2 may be utilized. If the combined wide-area score is greater than the threshold T2, an LUT number 3 is generally utilized. Other numbers of LUTs may be implemented to meet the criteria of a particular application.

In some embodiments, the wide-area raw score A value or the combined wide-area score may be a lookup table number. The number of LUTs may be clamped per formula 3 as follows to a maximum value to avoid having too many LUTs:

$$\text{Table}=\min(\text{wide-area score},\text{number of tables}-1) \quad (3)$$

In various embodiments, the wide-area raw score A value or the combined wide-area score value may be used to scale the value D received by the curve 302 or the LUT 264. The scaling may be implemented per formula 4 as follows:

$$D\_used = D\_before\_multiplication \times \text{wide-area score} \quad (4)$$

In other embodiments, the wide-area raw score A value or the combined wide-area score value may be used to offset the value D received by the curve 302 or the LUT 264. The offsetting may be implemented per formula 5 as follows:

$$D\_used = D\_before\_offset + \text{wide-area score} \quad (5)$$

In various embodiments, the combined wide-area score may be used to determine the alpha curve (or table) by selecting from a number of alpha curves (or tables). In some embodiments, the selection may be performed by directly using the combined wide-area score. Directly using the combined wide-area score may be appropriate where the combined wide-area score may take on a small number of values. In other embodiments, the selection may be performed by clamping the combined wide-area score. For example, if the combined wide-area score may take on values in a range of 0-255, and three alpha tables (e.g., alpha tables 0-3) are available, the alpha table may be selected per formula 6 as follows:

$$\text{Alpha table}=\min(3,\text{combined wide-area score}) \quad (6)$$

Referring to FIG. 9, a diagram of another example score combination 320 by lookup table is shown. A lookup table 326 may be programmed to perform a two-dimensional lookup on the combined wide-area score received in a signal 322 and the small-area score received in a signal 324. An entry (or value) stored at an index formed by the wide-area score 322 and the small-area score 324 may be presented by the lookup table 326 as the final combined score in a signal 328.

Referring to FIG. 10, is a flow diagram of another motion detection method 340 is shown. The method (or process) 340 may be performed by the circuit 102. The method 340 generally comprises a step (or state) 342, a step (or state) 344, a step (or state) 346, a step (or state) 348, a step (or state) 350, a step (or state) 352, a decision step (or state) 354, a step (or state) 356, a step (or state) 358, a step (or state) 360, a step (or state) 362, a decision step (or state) 364 and a step (or state) 366. The steps 342-366 may be implemented in hardware, software, firmware or any combination thereof in an apparatus (or circuit or device). The sequence of the steps is shown as a representative example. Other step orders may be implemented to meet the criteria of a particular application.

The steps 342-346, 352 and 362-366 in the method 340 may be similar to the steps 202-206, 212 and 224-228 in the method 200. In the step 348, the wide area of the down-sampled reference picture A (e.g., the frame 184a in FIGS. 3 and 5) may be compared with the spatially co-located wide area of the down-sampled reference picture B (e.g., the frame 186a) to generate the wide-area raw score B. The wide area of the down-sampled reference picture B (e.g., the frame 186a) may be compared in the step 350 to the spatially co-located wide area of the down-sampled reference picture C (e.g., the frame 188a) to generate the wide-area raw score C. The step 360 in the method 340 generally uses the combined wide-area score value, the small-area score value and the gain value to control the temporal filtering.

Various embodiments of the present invention generally provide a method for temporal filtering with noise-robust and slow-motion robust motion detection. Such detection may include, but is not limited to, motion detection based on observing if an area is stationary for several pictures, temporal filtering based on motion detection on small and big areas, temporal filtering based on comparing down-sampled pictures, and/or temporal filtering of adjacent pictures based on motion detection of non-adjacent pictures.

The functions and structures illustrated in the diagrams of FIGS. 1-10 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for temporal filtering based on reduced-resolution motion detection, comprising the steps of:
   down-sampling a target picture in a sequence of pictures to generate a reduced-resolution target picture;
   computing a plurality of reduced-resolution motion scores by motion detection between a reduced-resolution reference picture and said reduced-resolution target picture;
   up-sampling said reduced-resolution motion scores to generate a plurality of full-resolution motion scores; and
   temporal filtering said target picture with said reference picture based on said full-resolution motion scores to generate a filtered picture, wherein at least one of (i) said reduced-resolution motion scores and (ii) said generation of said filtered picture is controlled by one or more gain settings in a circuit.

2. The method according to claim 1, wherein said generation of said filtered picture blends said target picture with said reference picture.

3. The method according to claim 1, further comprising the steps of:
computing a first motion score of a first area in said reduced-resolution target picture based on said reduced-resolution motion scores; and
computing a second motion score of a second area in said target picture by motion detection of said second area between said target picture and said reference picture, wherein (i) said first area and said second area have different sizes relative to said target picture and (ii) said filtered picture is based on said first motion score and said second motion score.

4. The method according to claim 3, further comprising the step of:
computing a third motion score of a third area in an additional reduced-resolution reference picture by motion detection of said third area between said reduced-resolution target picture and said additional reduced-resolution reference picture, wherein said filtered picture is based on said first motion score, said second motion score and said third motion score.

5. The method according to claim 4, further comprising the step of:
computing a combined motion score by a combination of said first motion score and said third motion score, wherein said filtered picture is based on said combined motion score and said second motion score.

6. The method according to claim 5, further comprising the step of:
computing another motion score by a combination of said combined motion score and said second motion score, wherein said filtered picture is based on said another motion score.

7. The method according to claim 3, further comprising the step of:
computing a third motion score of a third area in an additional reduced-resolution reference picture by motion detection of said third area between said reduced-resolution reference picture and said additional reduced-resolution reference picture, wherein said filtered picture is based on said first motion score, said second motion score and said third motion score.

8. The method according to claim 1, wherein said reduced-resolution reference picture is motion compensated before said motion detection with said reduced-resolution target picture.

9. The method according to claim 1, wherein said circuit is part of a digital camera.

10. An apparatus comprising:
an interface configured to receive a sequence of pictures; and
a circuit configured to (i) down-sample a target picture in said sequence of pictures to generate a reduced-resolution target picture, (ii) compute a plurality of reduced-resolution motion scores by motion detection between a reduced-resolution reference picture and said reduced-resolution target picture, (iii) up-sample said reduced-resolution motion scores to generate a plurality of full-resolution motion scores and (iv) temporal filter said target picture with said reference picture based on said full-resolution motion scores to generate a filtered picture, wherein at least one of (a) said reduced-resolution motion scores and (b) said generation of said filtered picture is controlled by one or more gain settings.

11. The apparatus according to claim 10, wherein said generation of said filtered picture blends said target picture with said reference picture.

12. The apparatus according to claim 10, wherein (i) said circuit is further configured to (a) compute a first motion score of a first area in said reduced-resolution target picture based on said reduced-resolution motion scores and (b) compute a second motion score of a second area in said target picture by motion detection of said second area between said target picture and said reference picture, (ii) said first area and said second area have different sizes relative to said target picture and (iii) said filtered picture is based on said first motion score and said second motion score.

13. The apparatus according to claim 12, wherein (i) said circuit is further configured to compute a third motion score of a third area in an additional reduced-resolution reference picture by motion detection of said third area between said reduced-resolution target picture and said additional reduced-resolution reference picture and (ii) said filtered picture is based on said first motion score, said second motion score and said third motion score.

14. The apparatus according to claim 13, wherein (i) said circuit is further configured to compute a combined motion score by a combination of said first motion score and said third motion score and (ii) said filtered picture is based on said combined motion score and said second motion score.

15. The apparatus according to claim 14, wherein (i) said circuit is further configured to compute another motion score by a combination of said combined motion score and said second motion score and (ii) said filtered picture is based on said another motion score.

16. The apparatus according to claim 12, wherein (i) said circuit is further configured to compute a third motion score of a third area in an additional reduced-resolution reference picture by motion detection of said third area between said reduced-resolution reference picture and said additional reduced-resolution reference picture and (ii) said filtered picture is based on said first motion score, said second motion score and said third motion score.

17. The apparatus according to claim 10, wherein said reduced-resolution reference picture is motion compensated before said motion detection with said reduced-resolution target picture.

18. An apparatus comprising:
an image sensor configured to generate a sequence of pictures; and
a circuit configured to (i) down-sample a target picture in said sequence of pictures to generate a reduced-resolution target picture, (ii) compute a plurality of reduced-resolution motion scores by motion detection between a reduced-resolution reference picture and said reduced-resolution target picture, (iii) up-sample said reduced-resolution motion scores to generate a plurality of full-resolution motion scores and (iv) temporal-filter said target picture with said reference picture based on said full-resolution motion scores to generate a filtered picture, wherein at least one of (a) said reduced-resolution motion scores and (b) said generation of said filtered picture is controlled by one or more gain settings.

19. The method according to claim 1, further comprising the step of:

down-sampling said reference picture in said sequence of pictures to generate said reduced-resolution reference picture.

20. The apparatus according to claim 10, wherein said circuit is further configured to down-sample said reference picture in said sequence of pictures to generate said reduced-resolution reference picture.

\* \* \* \* \*